May 22, 1934.    H. J. KEITEL    1,959,630
ELASTIC RAPID COUPLING FOR PIPES AND HOSES
Filed Oct. 17, 1931
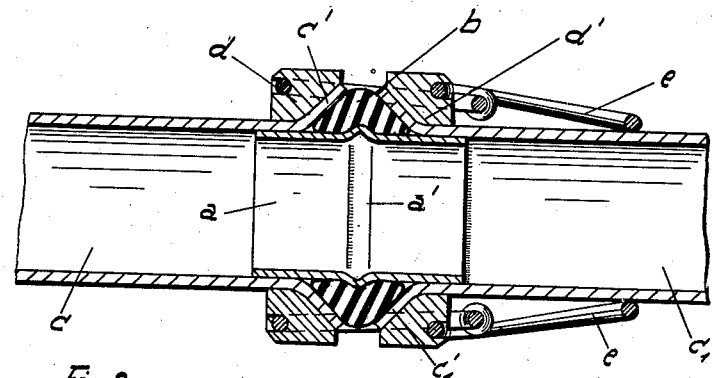
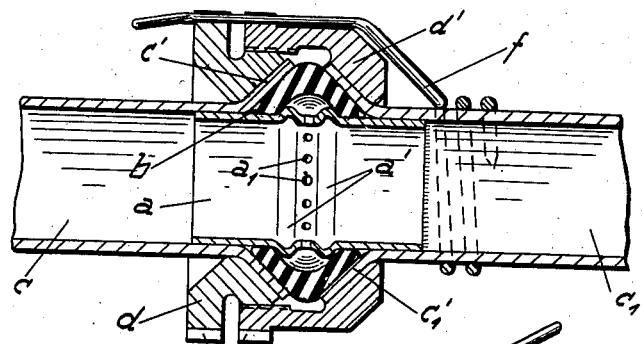
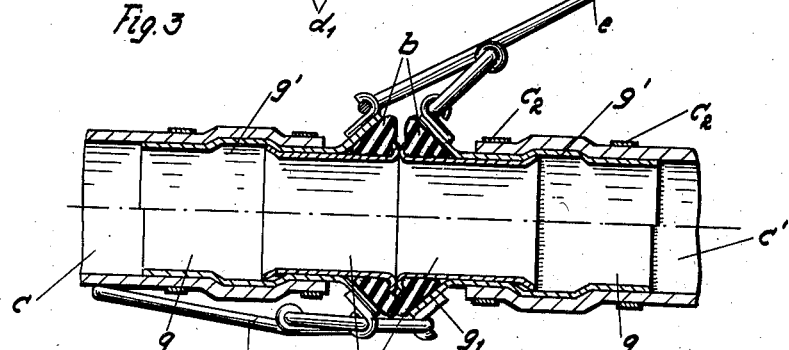
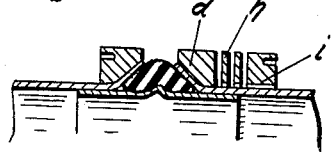
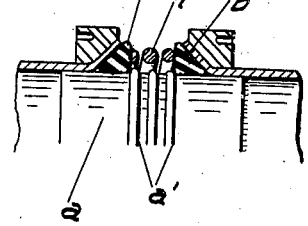
Inventor:
Hans Julius Keitel Patented May 22, 1934

1,959,630

UNITED STATES PATENT OFFICE 1,959,630

ELASTIC RAPID COUPLING FOR PIPES AND HOSES

Hans Julius Keitel, Friedrichshafen-on-Bodensee, Germany

Application October 17, 1931, Serial No. 569,506
In Germany October 27, 1930

4 Claims. (Cl. 285—79)

Everywhere, where it is necessary to lay pipe and hose lines as quickly as possible without loss of time, the main factor is a coupling which can be rapidly removed and fitted to interconnect two pipe ends. At the same time a perfect packing must be possible. This applies particularly to the service of the fire brigade, a perfectly tight and easily detachable coupling for connecting two pipes or hoses being however also very important in other branches.

Up to the present no coupling has become known which, besides allowing of a rapid coupling and uncoupling, also ensures a tight packing, without the aid of expensive accessory instruments, quite apart from the fact that their use is not possible at all in many cases, for example when very little space is available. Briefly the following points may be particularly mentioned to supplement that which has been set forth above:—

1. Fitting and dismantling without any accessory tool.
2. Requires but little space.
3. Withstands the actions of gases or liquids to be conducted.
4. Light weight, yieldability and insensitiveness to vibrations and jolting, besides simple construction.

These requirements are fulfilled in a perfect manner according to the invention in that the coupling is made of elastic packing material. It extends from a pipe length from the interior of the pipe ends, which are suitably bent outwards and is composed of two parts to be connected in any suitable manner, each part being arranged axially shiftable on the corresponding end of the pipes to be coupled. The connecting of the two coupling parts may be effected in various manners, for example by screwing together, or with the aid of a known rapid flange closure.

It may be said with regard to the packing material that this is constructed so that it adapts itself to the beaded pipe ends, and that it may also be made in a plurality of parts.

Several embodiments of the invention are illustrated by way of example in the accompanying drawing in which:

Fig. 1 is a longitudinal section showing the employment of a rapid flange closure.

Fig. 2 is a longitudinal section with screwed coupling parts, suitably locked.

Fig. 3 is a longitudinal section showing the employment of a divided packing element, when using rapid flange closure.

Fig. 4 is a part section of a coupling, wherein a spring is employed for increasing the elasticity of the connection.

Fig. 5 is a part section, also showing the employment of a spring for increasing the elasticity, but in this instance it is arranged between the two parts of the divided packing element.

Fig. 1 shows the simplest form of construction. A double cone-shaped coupling element $b$, made of elastic material, is held by a groove $a'$ on a pipe length $a$. The bevel surfaces of this element bear against the inner surfaces of the widened ends $c'$ and $c_1'$ of the two pipes $c$ and $c_1$ respectively. Two coupling elements $d$, $d'$ are placed on these widened ends $c'$, $c'_1$ and are adapted to be moved relative to each other by means of a known flange closure $e$. In clamped condition therefore the two coupling elements $d$, $d'$ press the flanges $c'$, $c_1'$ of the pipe ends $c$, $c_1$ against the packing elements $d$, whereby a perfect packing is obtained. The elasticity of the packing element $b$, which may be made of cork, rubber or similar elastic material, may be increased, especially when great elasticity of the coupling is required, by providing in the pipe length $a$ to be inserted in the pipe ends a plurality of grooves $a'$, which are gripped by the corresponding part of the double cone-shaped packing element $b$. The pressing of the pipe flanges $c'$ and $c_1'$ respectively of the pipe ends against this packing element $b$ may under certain circumstances, that is in the case of limited space not allowing the use of bulky rapid flange closures, be effected by screwing together the two pipe flanges $c'$ and $c'_1$, a locking pin $f$ wound several times around one of the pipe ends, for instance the end $c_1$, engaging in slot-like recesses $d_1$ of the coupling elements $d$, $d'$ (Fig. 2).

In order to obviate the necessity of loose parts on both pipe ends the construction illustrated in Fig. 3 and coming within the scope of the invention may be employed. In this instance the pipe length $a$ consists of two parts, which are each inserted in a pipe length $g$ arranged each in the corresponding pipe end $c$, $c_1$ respectively and having a widened groove like portion $g'$ in which the outwardly bent end of the pipe lengths $a$ is shiftable, the pipe lengths $q$ being fixed in the pipe ends $c$ and $c'$ respectively in known manner from the outer side by means of clamping rings $c_2$. The two parts of the pipe length $a$ carry at their other end the likewise divided packing element $b$ which, as in the first two forms of construction illustrated in Figs. 1 and 2, are pressed between the outwardly bent ends of the pipe lengths $g$. The outwardly bent ends $g_1$ of the pipe lengths $g$ are provided with elements of a rapid flange closure $e$. Fig. 3 relating to this construction shows in its upper half the commencement of the clamping process, whereas the lower half shows the coupling in locked position.

Where great elasticity is required for the entire coupling arrangement, pressure springs $h$ may be inserted, as shown in Fig. 4, which increase the elastic effect in the case of jolting and vibrations. Whereas in this figure the spring $h$ is provided between the pressure ring $d'$ and a supporting ring $i$, in the construction illustrated in Fig. 5, a spring $h$ is employed with divided packing element $b$, $b'$ which press against the wall of the pipe length $a$ and against the grooves $a'$.

It is advisable in the case of considerable internal pressure, to increase the effect of the packing $b$ by providing the pipe length with a plurality of bores $a_1$ so that the packing element is additionally pressed thereby against the outwardly bent flanges $c'$ and $c_1'$ (Fig. 2).

I claim:

1. An elastic rigid coupling for pipes and hoses for liquids and gases, comprising in combination with the pipe ends to be connected having widened ends, a tubular element extending into said pipe ends and having a circumferential enlargement intermediate its length, elastic packing material between said pipe ends and said tubular element and held in position by said circumferential enlargement, and means for pulling together said pipe ends to tightly compress said packing material to form a tight elastic coupling.

2. An elastic rigid coupling for pipes and hoses for liquids and gases, comprising in combination with the pipe ends to be connected having widened ends, a tubular element extending into said pipe ends and having a circumferential enlargement intermediate its length, elastic packing material between said pipe ends and said tubular element and held in position by said circumferential enlargement, resilient rings surrounding said pipe ends, and means cooperating with said rings to pull together said pipe ends and tightly compress said packing material to form a tight elastic coupling.

3. An elastic rigid coupling for pipes and hoses for liquids and gases, comprising in combination with the pipe ends to be connected having widened ends, a tubular element extending into said pipe ends and having a circumferential enlargement intermediate its length, elastic packing material formed in two parts one part in each of said pipe ends between said pipe ends and said tubular element and held in position by said circumferential enlargement, a resilient element between the two parts of said packing material, and means for pulling together said pipe ends to tightly compress said packing material to form a tight elastic coupling.

4. An elastic rigid coupling for pipes and hoses for liquids and gases, comprising in combination with the pipe ends to be connected having widened ends, a tubular element extending into said pipe ends and having a circumferential enlargement and perforations intermediate its length, elastic packing material between said pipe ends and said tubular element and held in position by said circumferential enlargement and pressed outwards against the inner side of said pipe ends by the pressure of the fluid passing through the coupling to form a tight joint between said pipe ends, and means for pulling together said pipe ends to compress said packing to increase the tightness of the joint.

HANS JULIUS KEITEL.